(No Model.)
J. L. ACKERMAN.
MEASURING DEVICE.
No. 553,820.  Patented Feb. 4, 1896.
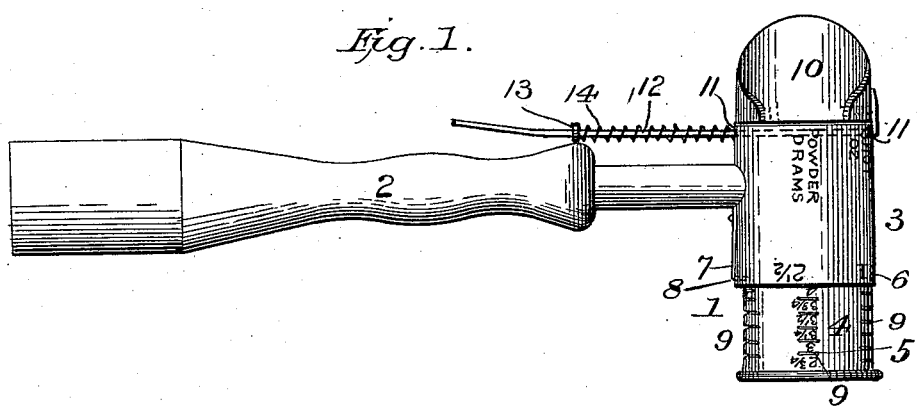
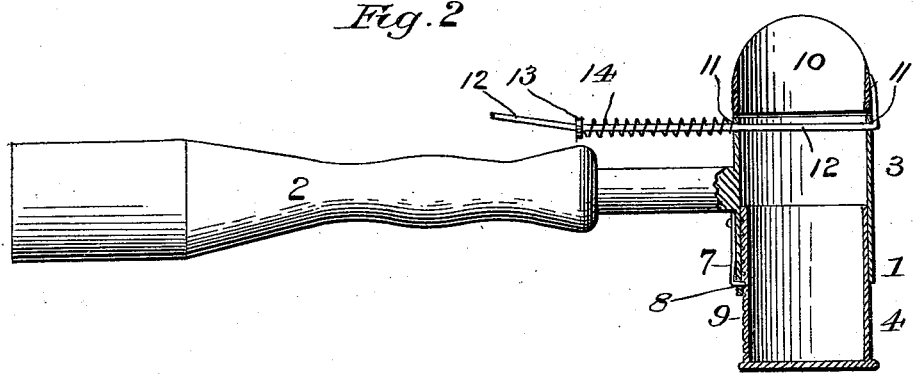
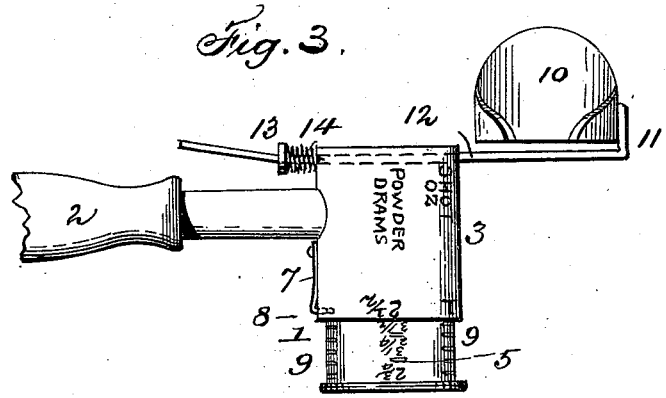
Witnesses
F. L. Ourand
H. S. Smit
Inventor
Jasper L. Ackerman.
By H. D. Wilson
Attorney

UNITED STATES PATENT OFFICE.

JASPER L. ACKERMAN, OF MONON, INDIANA.

MEASURING DEVICE.

SPECIFICATION forming part of Letters Patent No. 553,820, dated February 4, 1896.

Application filed April 3, 1895. Serial No. 544,307. (No model.)

*To all whom it may concern:*

Be it known that I, JASPER L. ACKERMAN, a citizen of the United States, residing at Monon, in the county of White and State of Indiana, have invented certain new and useful Improvements in Measuring Devices; and I do declare the following to be a full, clear, and exact description of the invention, such as will enable others skilled in the art to which it appertains to make and use the same.

My invention relates to measuring devices, and more particularly to devices for measuring uniform quantities of shot and powder for loading cartridges.

The object of the invention is to provide simple and inexpensive means for retaining the adjustable bottom section of the measure in its adjusted position, as well as to provide a simple and easily-operated scoop, by means of which the surplus shot or powder may be thrown off the measure, thus insuring a uniform load.

With these objects in view, the invention consists of certain features of construction and combination of parts which will be hereinafter fully described and claimed.

In the accompanying drawings, Figure 1 is a side view of my improved measuring device, and Fig. 2 is a longitudinal vertical sectional view of the same. Fig. 3 is a view similar to Fig. 1, showing the scoop projected forward.

1 denotes my improved measuring device, which comprises a suitable handle 2, the measure proper, 3, and its sliding or telescoping bottom section 4. This section 4 is provided with suitable scales 5 and 6, by which the quantity of the charge is determined.

7 denotes a spring, which is secured to the measure proper and is in the form of the letter L. The lower forward extending end of the spring passes through a slot 8 in the lower edge of the measure proper and engages with the notches or dents 9 in the sides of the bottom section, which correspond to the scales. The spring engages these dents or notches with only sufficient pressure to prevent the accidental movement of the bottom section with respect to the measure proper and will allow a free and easy adjustment of the two parts.

To enable an exact and uniform quantity of powder or shot to be measured, I secure the scoop 10 to the measure, so that it may be moved across the top thereof and sweep off any surplus. To secure this scoop in place, I form the upper end of the measure proper with diametrically opposite holes 11, through which projects the rod 12 secured to the scoop 10. The rod is provided with a shoulder 13, between which and the side of the measure proper and on the rod is supported a coil-spring 14, the energy of which is exerted to hold the scoop above the open end of the measure proper. After the powder or shot has been scooped into the measure, any surplus which may heap above the upper edge of the measure may be removed or swept off by simply pressing the rod outward by the thumb.

The device is extremely simple and may be produced at a small cost, while by its employment much time and labor are saved and a predetermined quantity of powder or shot is insured in loading the cartridges.

Having thus described my invention, what I claim, and desire to secure by Letters Patent, is—

The herein-described measuring device comprising a supporting-handle, a measure proper having diametrically-opposite holes in its sides near its upper end and an L-shaped spring projecting under its lower end, a bottom section having notches or dents to be engaged by said spring, a rod passed through said holes and provided with a shoulder, a scoop secured to said rod, and a coil-spring supported by said rod between its shoulder and the side of the measure, substantially as set forth.

In testimony whereof I affix my signature in presence of two witnesses.

JASPER L. ACKERMAN.

Witnesses:
D. C. GORDON,
M. V. HARNESS.